(12) United States Patent
Robinette et al.

(10) Patent No.: US 7,883,108 B2
(45) Date of Patent: Feb. 8, 2011

(54) INFLATOR FOR AN AIRBAG

(75) Inventors: Bryce Robinette, Brigham City, UT (US); Ken Clark, Morgan, UT (US)

(73) Assignee: Autoliv ASP, Inc., Ogden, UT (US)

(*) Notice: Subject to any disclaimer, the term of this patent is extended or adjusted under 35 U.S.C. 154(b) by 167 days.

(21) Appl. No.: 12/204,020

(22) Filed: Sep. 4, 2008

(65) Prior Publication Data
US 2010/0052299 A1 Mar. 4, 2010

(51) Int. Cl.
*B60R 21/26* (2006.01)
(52) U.S. Cl. .................................. 280/736; 280/741
(58) Field of Classification Search ................ 280/736, 280/737, 741
See application file for complete search history.

(56) References Cited

U.S. PATENT DOCUMENTS

| | | | |
|---|---|---|---|
| 5,747,730 A | 5/1998 | Scheffee et al. ............... | 149/47 |
| 5,772,243 A | 6/1998 | Green et al. | |
| 5,884,938 A | 3/1999 | Rink et al. | |
| 6,093,269 A | 7/2000 | Lundstrom et al. ............ | 149/36 |
| 6,435,552 B1 | 8/2002 | Lundstrom et al. .......... | 280/741 |
| 6,629,703 B2 * | 10/2003 | Horton et al. ............... | 280/737 |
| 6,718,884 B1 | 4/2004 | Yabuta et al. | |
| 7,210,703 B2 | 5/2007 | Young et al. ................ | 280/741 |
| 2003/0160438 A1 | 8/2003 | Quioc et al. | |
| 2004/0222620 A1 | 11/2004 | Wang et al. | |
| 2008/0023948 A1 * | 1/2008 | Kitayama et al. ........... | 280/736 |

FOREIGN PATENT DOCUMENTS

WO 2007/149173 A2 12/2007

OTHER PUBLICATIONS

International Search Report and Written Opinion of the International Searching Authority for International Application No. PCT/US2009/053738, dated Oct. 13, 2009, 7 Pages.

* cited by examiner

*Primary Examiner*—Faye M. Fleming
(74) *Attorney, Agent, or Firm*—Sally J Brown; Harness Dickey & Pierce

(57) ABSTRACT

An inflator for an airbag is provided. The inflator can include a housing that has a first end and a second end. The inflator can also include a gas generant disposed in the housing that defines a bore. The inflator can include an igniter coupled to the first end of the housing that can ignite the gas generant upon receipt of a signal. The inflator can further include a temporary closure coupled to the second end of the housing that can be opened to provide an exit out of the housing. The ignition of the igniter can generate a shockwave that passes through the bore to open the temporary closure.

22 Claims, 3 Drawing Sheets

INFLATOR FOR AN AIRBAG

FIELD

The present disclosure generally relates to pyrotechnic inflators for airbags.

BACKGROUND

The statements in this section merely provide background information related to the present disclosure and may not constitute prior art.

Inflatable safety restraint devices, or airbags can be found on most new vehicles. Airbags can typically include an inflator that can be connected to the one or more airbags positioned within the vehicle, and can rapidly produce a quantity of inflation fluid or gas that can fill the airbag(s) to protect the occupant(s).

For example, a vehicle can include an inflatable curtain airbag. The inflatable curtain airbag can be deployed from a headliner of the vehicle, and can inflate to protect the head of the occupant(s) from contact with the side of the vehicle, such as the windows. Certain inflatable curtain airbags, such as those designed to withstand mostly a lateral impact event, may utilize a "hot gas" inflator since cooling of the gas and the resulting loss of airbag pressure may not be an issue due to the short duration of the event. Other inflatable curtain airbags, such as those designed to withstand a rollover event can generally use "cold gas" inflators to meet the extended pressure requirements. As there is typically no heating of the gas in a "cold gas" inflator, these inflators can be heavy and very large to accommodate the volume of gas required to inflate the airbag. Accordingly, it may be desirable to provide a more compact inflator for a side curtain airbag.

SUMMARY

An inflator for an airbag is provided. The inflator can include a housing having a first end and a second end and defining a cavity. The inflator can also include a gas generant disposed in the housing for producing a combustion gas to inflate the airbag. The gas generant can define a bore. The inflator can also include a temporary closure for temporarily sealing the cavity. The inflator can include an igniter for igniting the gas generant to produce the combustion gas and for generating a shockwave to propogate through the bore and open the temporary closure.

Further provided is an inflator in combination with an airbag. The inflator can include a housing that defines a cavity, and has a first end and a second end. The inflator can also include a compressed gas normally retained within the chamber at a first temperature. The inflator can include a gas generant of a combustible material disposed in the chamber, and the gas generant can define a throughbore. The inflator can also include a temporary closure that seals the cavity from the airbag prior to inflation of the airbag. The inflator can further include an igniter disposed within the housing that opens the temporary closure to allow release of at least a portion of the compressed gas at a first temperature from the cavity to the airbag. The igniter can be further operative to ignite the gas generant for generating a combustion gas at a second temperature.

Also provided is a method for inflating an airbag. The method can include igniting a reactive charge upon receipt of a signal. The method can also include opening a temporary closure with a shockwave created by the ignition of the reactive charge. The method can also include propagating the reactive charge through a bore extending through a gas generant to open the temporary closure. The method can further include igniting the gas generate. The method can include inflating the airbag with a gas that passes through an opening created by opening the temporary closure.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DESCRIPTION OF VARIOUS ASPECTS

The following description is merely exemplary in nature and is not intended to limit the present teachings, their application, or uses. Although the following description is related generally to an inflator that can be used with an airbag system in an automobile, it will be understood that the inflator, as described and claimed herein, can be used with any suitable vehicle, such as a train, bus, aircraft, etc. Therefore, it will be understood that the following discussions are not intended to limit the scope of the appended claims.

Figure 1:
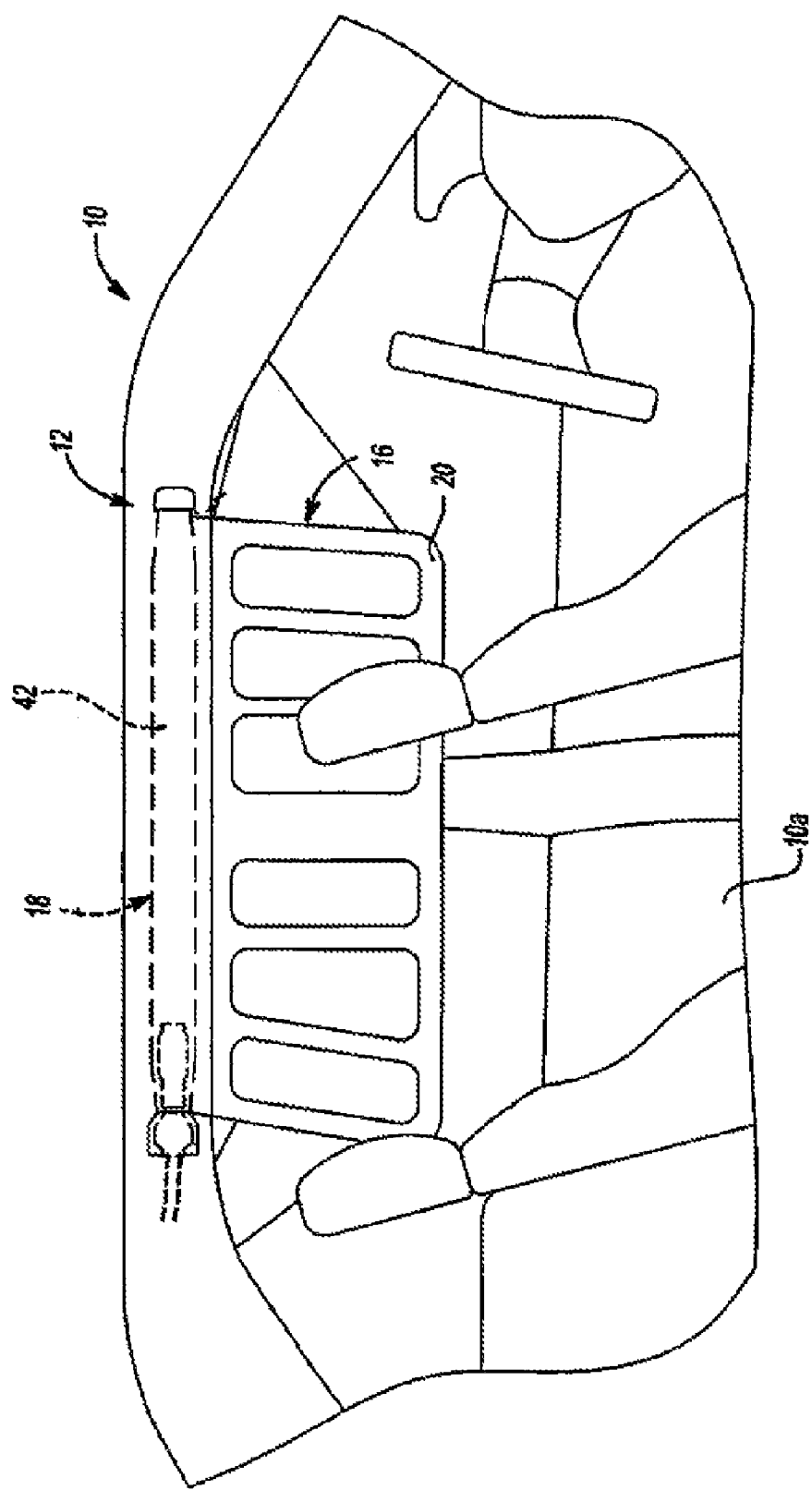
FIG. 1 is a schematic illustration of an exemplary motor vehicle including an inflator for inflating an airbag according to the principles of the present disclosure, the airbag shown in a first or deployed position.

With reference to FIG. 1, a portion of an exemplary motor vehicle 10 including an airbag system 12 is shown. The airbag system 12 can include an airbag 16 and an inflator 18. As various airbags 16 known in the art could be employed with the inflator 18, such as a front impact airbag, a knee bolster, an inflatable curtain, or an overhead airbag, the airbag 16 will not be discussed in great detail herein. Briefly, however, with particular reference to FIG. 2, the airbag 16 can include a cushion 20, which can be stored within a trim panel 22 of the motor vehicle 10. In this example, the airbag 16 can comprise a side impact inflatable curtain airbag, which when inflated by the inflator 18 can occupy a large volume of a passenger cabin 10a in the motor vehicle 10 as illustrated in FIG. 1. Generally, the inflator 18 can create a rapidly expanding gas that can inflate the airbag 16 within milliseconds of detection of a predetermined event (e.g., impending vehicle rollover) of the motor vehicle 10 to enable the airbag 16 to inflate and create a barrier between occupant(s) of the motor vehicle 10 and the motor vehicle 10 itself, which may prevent or minimize injuries to the occupant(s).

Figure 2:
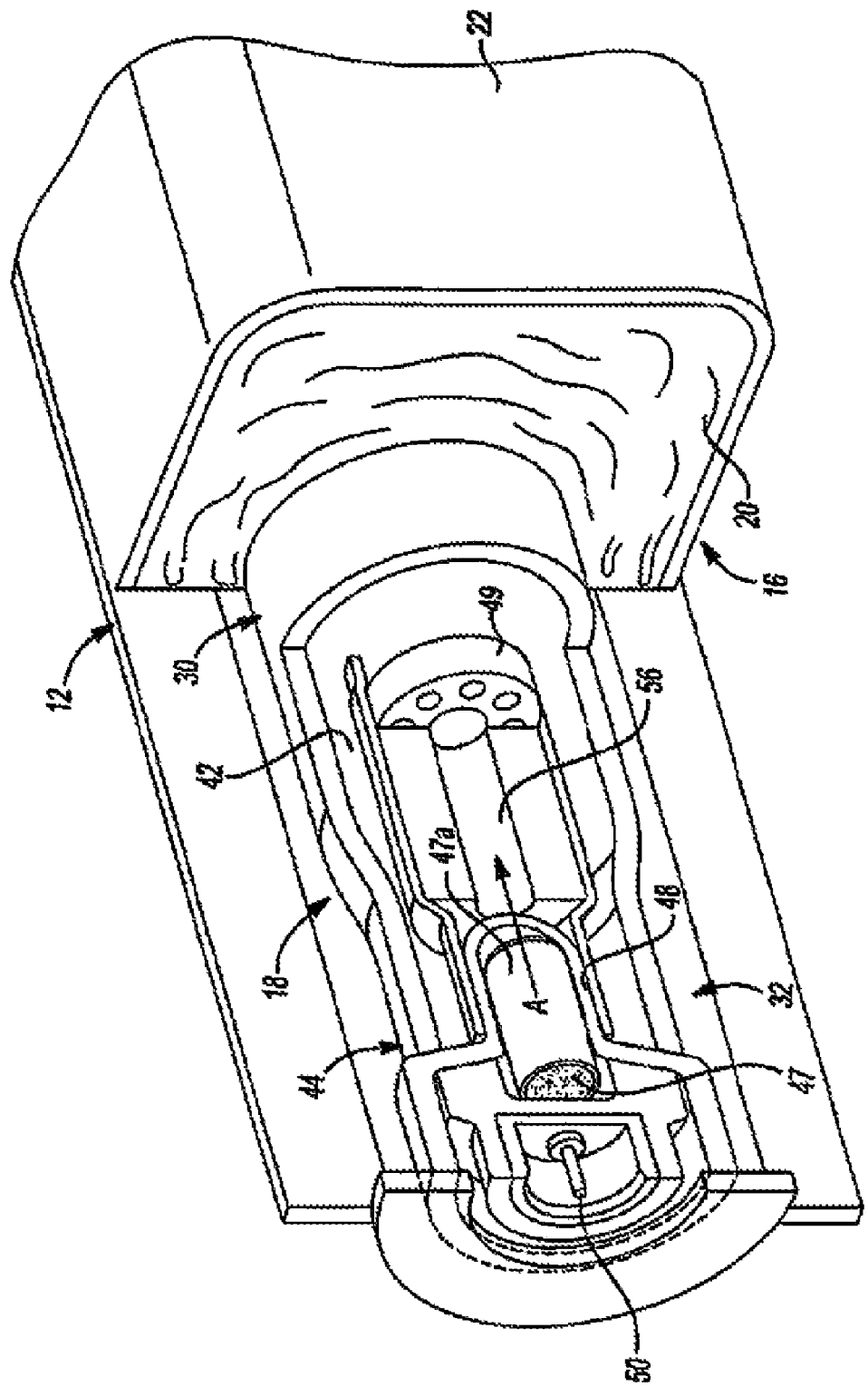
FIG. 2 is a partially cut-away illustration of the inflator of FIG. 1, shown operatively associated with the airbag, the airbag shown in a second or stowed position.
Figure 3:
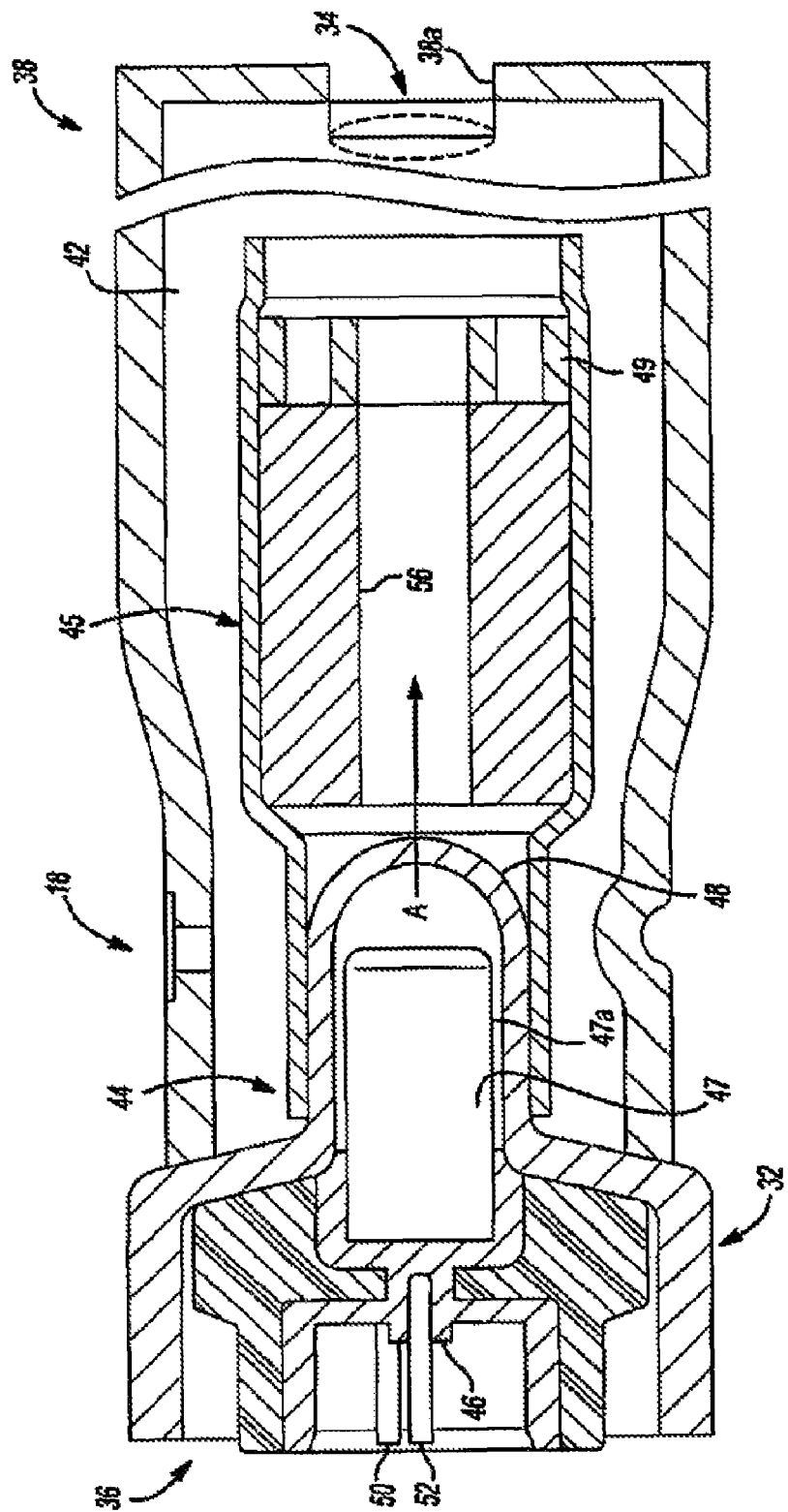
FIG. 3 is a detailed sectional view of the inflator of FIG. 1.

Generally, with reference to FIGS. 2 and 3, the inflator 18 can include a housing 30, an igniter system 32 and a closure member in the form of a rupturable gas outlet membrane or burst disk 34 (FIG. 3). The housing 30 can be cylindrical, and can have a generally circular cross section. The housing 30 can be composed of a metal or metal alloy, such as steel, magnesium alloy, etc., and can be formed through any suitable method, such as stamping, machining, casting, extrusion, etc. With reference to the environmental view of FIG. 1, it should be noted that although the housing 30 is illustrated as having a particular length relative to the vehicle 10, the housing 30 could have any suitable length. The housing 30 can have a first end 36, a second end 38 and can define an intermediate portion defining a cavity 42.

The first end 36 can be coupled to the igniter system 32. With reference to FIG. 3, the second end 38 can define an outlet 38a. The outlet 38a can be in communication with the airbag 16 to enable gases within the housing 30 to inflate the airbag 16. As will be discussed, the burst disk 34 defines a temporary closure for the housing 30 that can be positioned over the outlet 38a to control the inflation of the airbag 16. As shown in FIGS. 1 and 3, the cavity 42 can generally extend from the first end 36 to the second end 38, and can store a compressed gas. Generally, the cavity 42 can be configured to store the compressed gas at a pressure from about 6500 pounds per square inch to about 8500 pounds per square inch, for example. This pressure may vary, however, for particular applications.

With reference to FIGS. 2 and 3, the igniter system 32 can include an initiator 44 and a gas generant 45. As the initiator 44 can comprise any suitable initiator, such as that disclosed in commonly assigned U.S. Pat. No. 7,210,703, incorporated herein by reference in its entirety, the initiator 44 will not be discussed in detail herein. Briefly, however, the initiator 44 can include a squib 46, a reactive charge 47, a dome or cap 48, a first conductive pin 50, a second conductive pin 52 and a bridgewire (not specifically shown). The squib 46 can produce an ignition charge upon receipt of an electrical signal, such as an electrical current, as will be discussed. The reactive charge 47 can be contained within a charge chamber 47a, and can be in communication with and responsive to the squib 46 to ignite upon receipt of the charge from the squib 46. Typically, the ignition of the reactive charge 47 can create a shockwave, which can radiate away from the reactive charge 47 in a direction generally indicated by the arrow A. The shockwave A can rupture the cap 48, and can pass through the gas generant 45, as will be discussed herein.

Prior to activation of the reactive charge 47, the cap 48 can seal the gas generant 45 and the chamber 40 of the housing 30 from the initiator 44. Generally, the cap 48 can be positioned between the initiator 44 and the generant 45. The first conductive pin 50 can be isolated from the squib 46, while the second conductive pin 52 can be coupled to the squib 46. The bridgewire can connect the first conductive pin 50 to the second conductive pin 52. Additional reactive charge 47 can also be packed about the bridgewire, if desired. Upon receipt of a signal, such as a signal indicative of an impending rollover or other vehicle in which airbag deployment is desired, an electric current can be introduced to the first conductive pin 50 and the second conductive pin 52. The introduction of the electric current can cause the squib 46 to fire, and produce an ignition charge, which in turn, can ignite the reactive charge 47 to create the shockwave A.

The reactive charge 47 can ignite the gas generant 45 after at least a portion of the shockwave A passes through a bore 56 defined in the gas generant 45. In the embodiment illustrated, the gas generant 45 can comprise any material suitable for generating sufficient combustion gases to inflate the airbag 16. The gas generant 45 can be a solid grain that comprises a pyrotechnic material. As is known, in certain applications, the gas generant 45 can comprise a monolithic gas generant grain. Examples of suitable gas generants are described in commonly owned U.S. Ser. No. 11/472,260 filed 21 Jun. 2006, which is hereby incorporated by reference as if fully set forth herein. It will be understood, however, that other gas generants may be employed within the scope of the present teachings.

The gas generant 45 can generally be formed into one or more cylindrical structures. It should be understood, however, that although the gas generant 45 can have any desired shape, so long as propagation of the shockwave A is provided. The gas generant 45 can be held in place with a plug 49, if desired. The gas generant 45 can generally be ignited by the ignition of the reactive charge 47.

The bore 56 can generally be formed or defined about a longitudinal axis defined by the gas generant 45, and the gas generant 45 can be positioned proximate to the cap 48 of the initiator 44 such that at least a portion of the shockwave A can travel through the bore 56. The bore 56 can have any desired shape, but can generally have a circular cross-section. In addition, the bore 56 can be of any suitable size to enable the transmission of a sufficient shockwave A to open the temporary closure or burst disk 34. As an example, the bore 56 can have a diameter from about 4.5 millimeters to about 9.0 millimeters. For certain applications, the diameter of the bore 56 can be proportional to a diameter of the gas generant 45, and thus, the diameter of the bore 56 may increase or decrease depending upon the diameter of the gas generant 45. The passage of at least a portion of the shockwave A through the gas generant 45 can rupture the burst disk 34.

With reference to FIG. 3, the burst disk 34 can comprise any rupturable device or other temporary closure device that can be positioned over the outlet 38a of the second end 38 of the housing 30. In certain applications, the burst disk 34 can include one or more scored seams to facilitate the rupturing of the burst disk 34. The burst disk 34 can generally be rupturable to open to enable the compressed gas to exit the cavity 42 of the inflator 18 and inflate the airbag 16.

In this regard, as the shockwave A can initially rupture the burst disk 34, at least a portion of the compressed gas at a first temperature can enter the airbag 16 for initially inflating the airbag 16. Generally, the first temperature can generally comprise the ambient, unheated temperature of the compressed gas within the cavity 42. As the ignition of the reactive charge 47 ignites the gas generant 45, a combustion gas is generated that has a second temperature or increased temperature. The heated combustion gas can pass through the outlet 38a to further inflate the airbag 16.

In the manner described, the inflator 18 can be used to quickly inflate a large volume airbag 16, such as a side curtain airbag. In the event of an impending rollover, for example, a signal in the form of an electric current can trigger the initiator 44, causing the squib 46 to ignite the reactive charge 47. The ignition of the reactive charge 47 can create the shockwave A. The shockwave A can rupture the cap 48, and can pass through the bore 56 defined in the gas generant 45 to rupture the burst disk 34 (FIG. 3).

With reference to FIG. 3, when the burst disk 34 ruptures, at least a portion of the compressed gas stored within the chamber 40 can pass through the outlet 38a of the second end 38 of the housing 30. As the compressed gas that initially flows through the outlet 38a to inflate the airbag 16 can be unheated, "cold" or at a first temperature, the initial impact pressures on the airbag 16 can be minimized, which in turn can decrease the potential damage to the airbag 16.

The inflator 18 can inflate large volume airbags very quickly. In addition, by storing the compressed gas at about 6500 pounds per square inch to about 8500 pounds per square inch in the chamber 40, the inflator 18 can consistently perform as this pressure can maximize the ignitability of the gas generant 45, and can enhance burn rate characteristics of the gas generant 45. Further, the use of the gas generant 45 can decrease the length of the housing 30, when compared to a standard cold gas inflator, while supplying enough pressure to sustain the airbag 16 for an extended period (e.g., during a vehicle rollover event).

While specific examples have been described in the specification and illustrated in the drawings, it will be understood by those of ordinary skill in the art that various changes can be made and equivalents can be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example can be incorporated into another example as appropriate, unless described otherwise, above. Moreover, many modifications can be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

What is claimed is:

1. An inflator for an airbag, comprising:
   a housing having a first end and a second end and defining a cavity;
   a gas generant disposed in the housing for producing a combustion gas to inflate the airbag, the gas generant defining a bore;
   a temporary closure for temporarily sealing the cavity; and
   an igniter for igniting the gas generant to produce the combustion gas and for generating a shockwave to propogate through the bore and open the temporary closure.

2. The inflator of claim 1, wherein the housing defines a cavity and the inflator further includes a compressed gas stored in the cavity of the housing at a first temperature for initially inflating the airbag.

3. The inflator of claim 2, wherein ignition of the gas generant generates the combustion gas at a second temperature greater than the first temperature.

4. The inflator of claim 3, wherein when the temporary closure opens, the compressed gas at the first temperature enters the airbag to begin to inflate the airbag.

5. The inflator of claim 1, in combination with the airbag.

6. The inflator of claim 5, wherein the airbag is a side impact airbag, a side curtain airbag, a front impact airbag, or a knee bolster airbag.

7. The inflator of claim 1, wherein the bore extends from a first end of the gas generant to a second end of the gas generant, and extends generally along a central axis of the gas generant.

8. The inflator of claim 6, wherein the bore has a diameter from about 4.5 millimeters to about 9.0 millimeters.

9. The inflator of claim 2, wherein the compressed gas is stored in the chamber at a pressure from about 6500 pounds per square inch to about 8500 pounds per square inch.

10. The inflator of claim 1, wherein the gas generant is a monolithic grain.

11. An inflator in combination with an airbag comprising:
    a housing that defines a cavity, and has a first end and a second end;
    a compressed gas normally retained within the chamber at a first temperature;
    a gas generant of a combustible material disposed in the chamber, the gas generant defining a throughbore;
    a temporary closure sealing the cavity from the airbag prior to inflation of the airbag; and
    an igniter disposed within the housing that opens the temporary closure to allow release of at least a portion of the compressed gas at a first temperature from the cavity to the airbag, the igniter further operative to ignite the gas generant for generating a combustion gas at a second temperature.

12. The inflator of claim 11, wherein the temporary closure is a burst disk and ignition of the igniter generates a shockwave that ruptures the burst disk.

13. The inflator of claim 11, wherein the airbag is a side impact airbag.

14. The inflator of claim 11, wherein the throughbore extends from a first end of the gas generant to a second end of the gas generant, and extends substantially along a central axis of the gas generant.

15. The inflator of claim 14, wherein the throughbore has a diameter from about 4.5 millimeters to about 9.0 millimeters.

16. The inflator of claim 11, wherein the compressed gas is stored in the chamber at a pressure from about 6500 pounds per square inch to about 8500 pounds per square inch.

17. The inflator of claim 11, wherein the gas generant is a monolithic grain.

18. A method for inflating an airbag comprising:
    igniting a reactive charge upon receipt of a signal;
    opening a temporary closure with a shockwave created by the ignition of the reactive charge;
    propogating the reactive charge through a bore extending through a gas generant to open the temporary closure;
    igniting the gas generant; and
    inflating the airbag with a gas that passes through an opening created by opening the temporary closure.

19. The method of claim 18, wherein the side airbag further comprises:
    storing a compressed gas at a first temperature proximate the gas generant;
    initially inflating the airbag with at least a portion of the compressed gas at the first temperature;
    generating a combustion gas at a second temperature; and
    further inflating the airbag with the combustion gas.

20. The method of claim 18, wherein inflating the airbag further comprises:
    inflating a side curtain airbag.

21. The inflator of claim 1, wherein the ignitor is proximate the first end of the housing and the temporary closure is proximate the second end of the housing.

22. The inflator of claim 2, wherein the gas generant is disposed within the compressed gas prior to activation of the inflator.

* * * * *